United States Patent
Nosaka et al.

(10) Patent No.: US 7,223,176 B2
(45) Date of Patent: May 29, 2007

(54) TORQUE TRANSMISSION SYSTEM (75) Inventors: Michiyasu Nosaka, Anjo (JP); Kiyoshi Kurohata, Kariya (JP)

(73) Assignee: Denso Corporation, Kariya (JP)

( * ) Notice: Subject to any disclaimer, the term of this patent is extended or adjusted under 35 U.S.C. 154(b) by 471 days.

(21) Appl. No.: 10/673,337

(22) Filed: Sep. 30, 2003

(65) Prior Publication Data

US 2004/0082390 A1 Apr. 29, 2004

(30) Foreign Application Priority Data

Oct. 25, 2002 (JP) .............................. 2002-310817

(51) Int. Cl.
*F16D 3/70* (2006.01)
(52) U.S. Cl. ........................ 464/73; 464/160
(58) Field of Classification Search .................. 464/32, 464/73, 74, 81, 83, 87, 160; 192/209; 417/223, 417/319; 415/124.2; 416/500; 474/902, 474/903
See application file for complete search history.

(56) References Cited

U.S. PATENT DOCUMENTS 6,123,620 A * 9/2000 Polakowski .................. 464/73

| | | |
|---|---|---|
| 6,626,139 B1 | 9/2003 | Horita et al. |
| 6,802,779 B2 | 10/2004 | Tabuchi et al. |
| 2002/0052242 A1 | 5/2002 | Tabuchi et al. |

FOREIGN PATENT DOCUMENTS

JP   A-2002-276777   9/2002
SU   750165   * 7/1980 .................. 464/74

OTHER PUBLICATIONS

Notice of Reason for Rejection from Japanese Patent Office issued on Nov. 14, 2006 for the corresponding Japanese patent application No. 2002-310817 (a copy and English translation thereof).

* cited by examiner

*Primary Examiner*—Greg Binda
(74) *Attorney, Agent, or Firm*—Posz Law Group, PLC

(57) ABSTRACT

When a first damper contacts both of a protruding portion of a pulley body and a protruding portion of a center hub, a second damper is disposed as being apart from the protruding portion of the center hub with a gap. Even when the pulley body is rotated in a reverse direction, no reverse torque is thereby transmitted to the center hub as long as the gap exists, or before the second damper contacts the protruding portion of the center hub. As a result, torque fluctuation is sufficiently absorbed. This prevents the following: a reverse torque is transmitted to the center hub; a torque limiter wrongly acts; a fastening part between a shaft and the center hub loosens; or abnormal noise or aversive vibration takes place.

6 Claims, 6 Drawing Sheets

TORQUE TRANSMISSION SYSTEM

CROSS REFERENCE TO RELATED APPLICATIONS

This application is based on and incorporates herein by reference Japanese Patent Application No. 2002-310817 filed on Oct. 25, 2002.

FIELD OF THE INVENTION

The present invention relates to a torque transmission system that transmits torque generated by a driving unit to a rotating unit. The present invention is suitably applied to a torque transmission system transmitting a torque from a driving unit such as an engine to a rotating unit such as an alternator or a compressor mounted in a vehicle.

BACKGROUND OF THE INVENTION

For instance, as disclosed in JP-A-2002-147485, torque fluctuation in a torque transmission system is conventionally absorbed by using a damper that is formed of elastic material such as rubber when a torque is transmitted from a driving-side rotating unit to a driven-side rotating unit. Here, in the damper disclosed in JP-A-2002-147485, an elastic coefficient k1 in a portion on which a torque acts in a normal rotation direction is greater than an elastic coefficient k2 in a portion on which a torque acts in a reverse rotation direction. The damper is thereby prevented from exceeding an elastic limit, so that the damper transmits a great torque along with absorbing the torque fluctuation.

A so-called direct injection type of an internal combustion engine, which directly supplies a combustion room with fuel, has greater torque fluctuation, due to its large fluctuation of a rotation angle, than a previously mixing type of an internal combustion engine that previously mixes fuel and air. Therefore, in the direct injection type of the internal combustion engine, the torque transmission system disclosed in JP-A-2002-147485 may not sufficiently absorb the torque fluctuation.

When the torque fluctuation is not sufficiently absorbed, various kinds of defects take place. Namely, a torque limiter wrongly acts, a fastening part between a shaft of a compressor and a hub of the torque transmission system loosens, or abnormal noise or aversive vibration takes place.

SUMMARY OF THE INVENTION

It is an object of the present invention to provide a new type of a torque transmission system capable of sufficiently absorbing torque fluctuation.

To achieve the above object, a torque transmission system for transmitting a torque from a driving unit to a rotation unit is provided with the following. A first rotating member is rotated by receiving the torque by the driving unit. A second rotating member is connected to a rotating portion of the rotation unit, rotated along with the rotation portion, and disposed coaxially with the first rotating member. Each of a first and second torque transmitting members is elastically transformable and disposed as being sandwiched between a first protruding portion of the first rotating member and a second protruding portion of the second rotating member. Here, the first protruding portion protrudes towards the second rotating member while the second protruding portion protrudes towards the first rotating member with being displaced from the first protruding portion in a rotating direction. When the first torque transmitting member contacts both the first and second protruding portions, the second torque transmitting member is disposed as being apart, with a gap, from at least one of the first and second protruding portions.

Increasing a rotation speed of a driving unit or a first rotating member according to torque fluctuation generates a rotation angle bias in a reverse rotation direction between the first rotating member and the second rotating member. However, in the embodiment, when the first torque transmitting member contacts both of the first and second protruding portions, the second torque transmitting member is disposed as being apart from at least one of the first and second protruding portions with a gap. Even when the first rotation member is rotated in a reverse rotation direction relative to the second rotation member, no reverse torque is transmitted to the second rotation member as long as the gap exists, i.e., before the second torque transmitting member contacts the second protruding portion.

As a result, the torque fluctuation is sufficiently absorbed. This thereby prevents transmission of a reverse torque to the center hub, loosening of fastening part between the second rotating member and the rotating unit, or abnormal noise or aversive vibration. Furthermore, this enables the elastic coefficients of the first and second torque transmitting members to be relatively small, so that torque fluctuation in a normal or reverse rotation direction can be sufficiently absorbed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
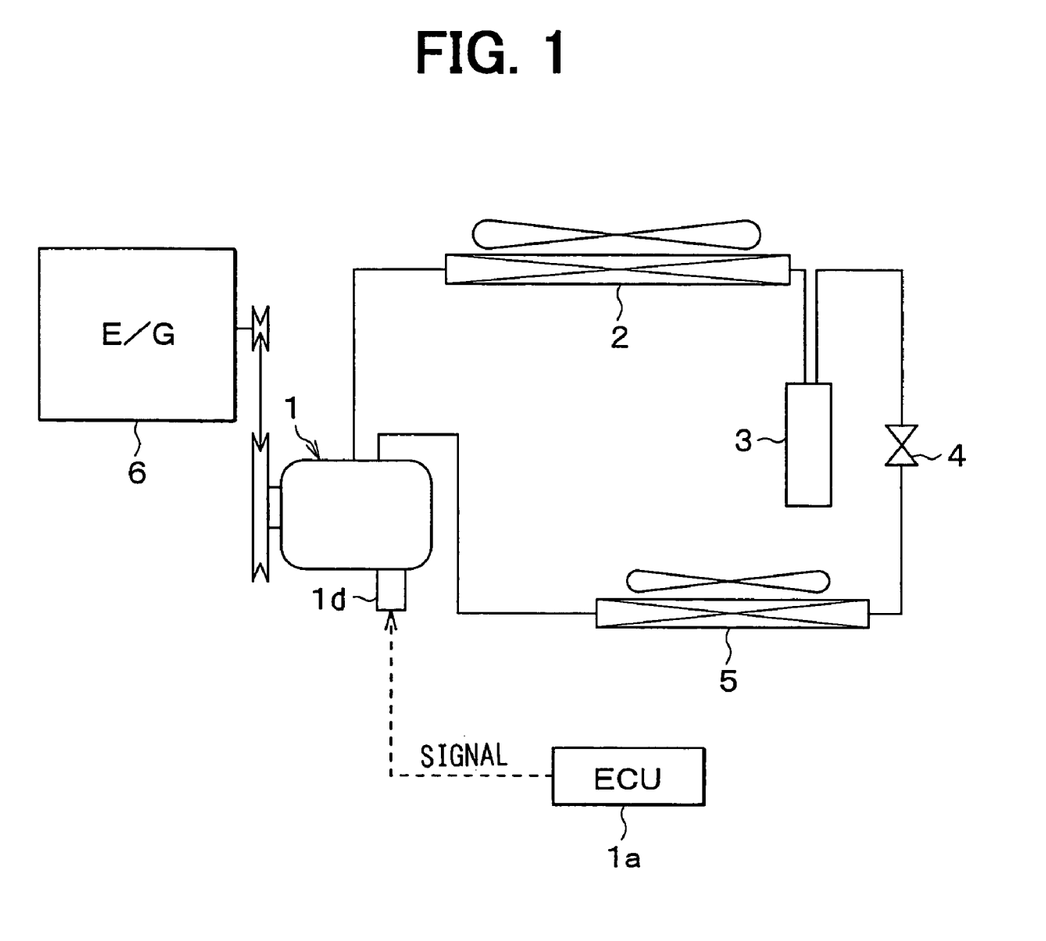
FIG. 1 is a schematic diagram of a vehicular air conditioning system, i.e., a vapor compressing type of a refrigerator, according to embodiments of the present invention.

A first embodiment of the present invention is directed to a torque transmission system that transmits, to a compressor of a vehicular air conditioning system, a driving force of an engine for vehicle traveling. FIG. 1 shows a schematic diagram of the vehicular air conditioning system, i.e., a vapor compression type of a refrigerator.

A compressor 1 is a variable displacement type that sucks and compresses a refrigerant. A radiator 2 is a high-pressure-side heat exchanger that cools the refrigerant discharged from the compressor 1. A gas-liquid separator 3 is a receiver that separates the refrigerant, flowing out from the heat exchanger 2, into a gas-phase refrigerant and a liquid-phase refrigerant to discharge the liquid-phase refrigerant.

The compressor 1 changes a discharging amount by changing an inclination angle of a swash plate reciprocating a piston. Here, the discharging amount means a theoretical discharging amount while a shaft is rotated by a 360-degree roll. The inclination angle is changed by controlling pressure of a swash plate chamber (crank chamber) containing a swash plate with a control valve 1d that is controlled by an electronic control system 1a.

A decompressor 4 decompresses the refrigerant flowing out from the receiver 3. Along with decompressing the refrigerant in iso-enthalpy, the decompressor 4 adopts a temperature-detecting expansion valve controlling a throttle opening so that a degree of superheat can become a given value. An evaporator 5 is a low-pressure-side heat exchanger exerting cooling capability (freezing capability) by vaporizing the refrigerant decompressed in the decompressor 4.

A pulley 10 is a torque transmission system (hereinafter, called as a pulley) of a pulley-integrated type that transmits to the compressor 1, being a rotating unit, driving force transmitted via a V-belt from an engine 6 being a driving source. The pulley 10 will be explained below in detail with referring to FIGS. 2 to 4.

Figure 2:
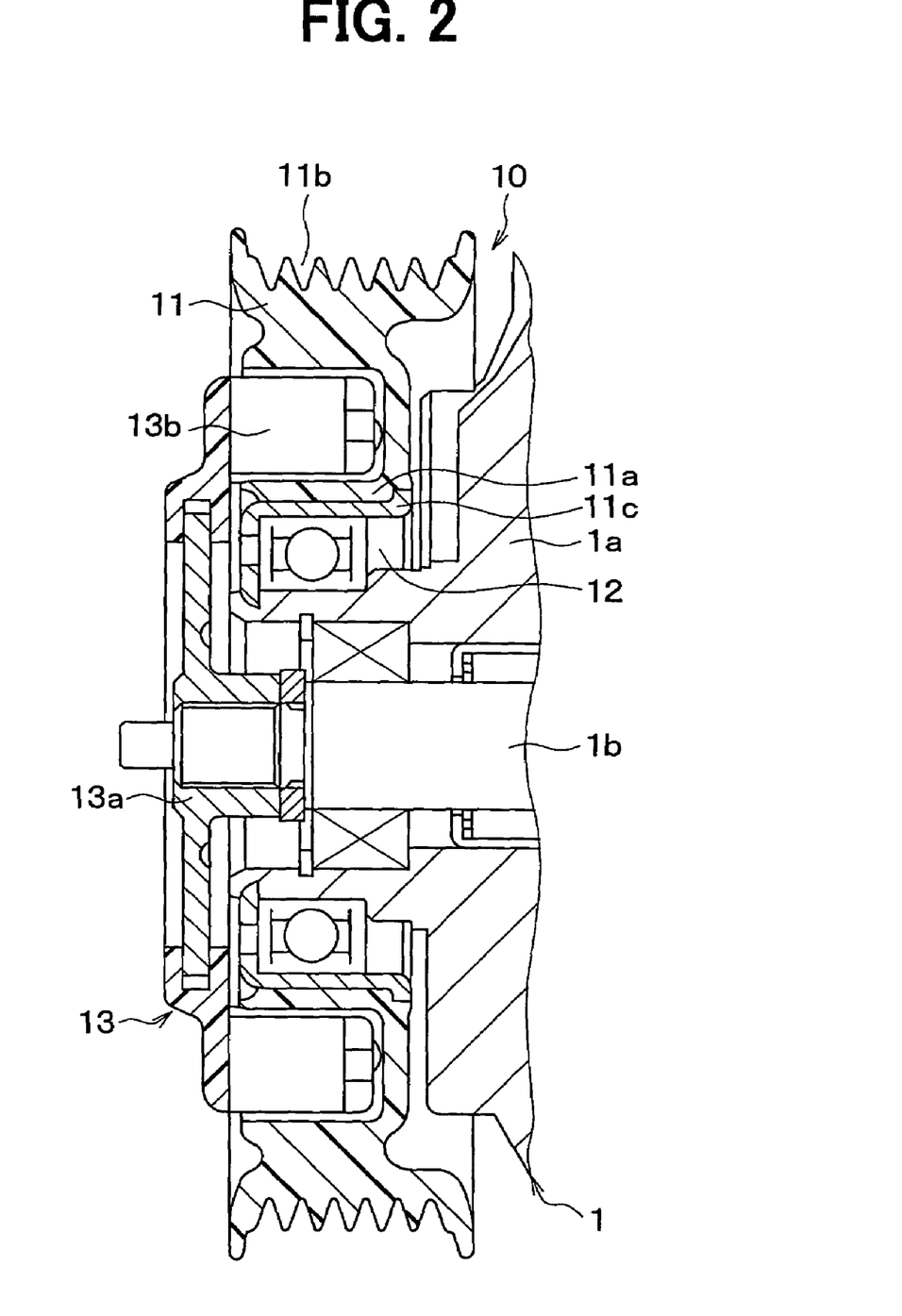
FIG. 2 is a sectional view of a pulley according to a first embodiment.
Figure 3:
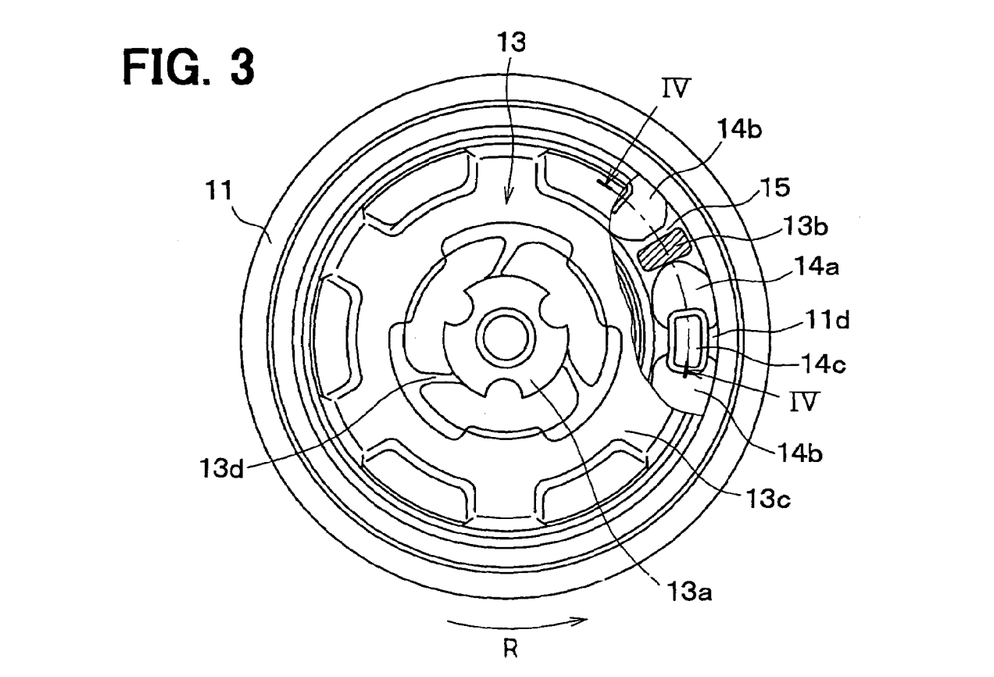
FIG. 3 is a left-side view, partially including a sectional view, of a pulley according to the first embodiment.

As shown in FIG. 2, a pulley body 11 is a first rotating member that is formed of metal or hard resin (phenol resin in this embodiment), approximately cylindrical, and rotated by driving force from the engine 6 via the V-belt. A cylindrical pulley hub 11a is integrally molded inside the pulley 10. Radial bearings 12 are loaded on the pulley hub 11a so as to rotatably support the pulley body 11. An inner ring of the bearings 12 is pressed into a front housing 1a of the compressor 1.

The pulley body 11 is accommodated to a V-ribbed belt with having plural V-shaped grooves 11b. The pulley body 11 is formed of resin. A metal-made sleeve 11c is thereby disposed along the inner surface of the pulley hub 11a to face the bearings 12, and integrated, by insertion forming, to the pulley hub 11a.

A center hub 13 is a second rotating member that is connected with a shaft 1b being a rotating portion of the compressor 1 to be rotated along with the shaft 1b. The center hub 13 is constituted by a boss portion 13a, a plate portion 13c, and a bridge portion 13d. The boss portion 13a has a female screw being connected with a male screw formed on the outer surface of the shaft 1b. The plate portion 13c has a plurality of protruding portions 13b that protrude towards the pulley body 11 to receive a torque supplied from the pulley body 11. The bridge portion 13d mechanically connects the plate portion 13c and the boss portion 13b, transmits a torque from the plate portion 13c to the boss portion 13a, and is designed as being broken when the transmitted torque exceeds a given value. Dimensions of both the dampers 14a, 14b and both the protruding portions 11d, 13b in a direction of a compressing force are designed as having a gap 15 between the second damper 14b and at least one of the protruding portion 11d and the protruding portion 13b when the damper 14a connects both the protruding portions 11d, 13b.

The boss portion 13a and the bridge portion 13d are formed by sintering metal powders to be integrated with each other. The plate portion 13c is formed of resin. The bridge portion 13d and the plate portion 13c are integrated with each other by insertion forming.

Figure 4:
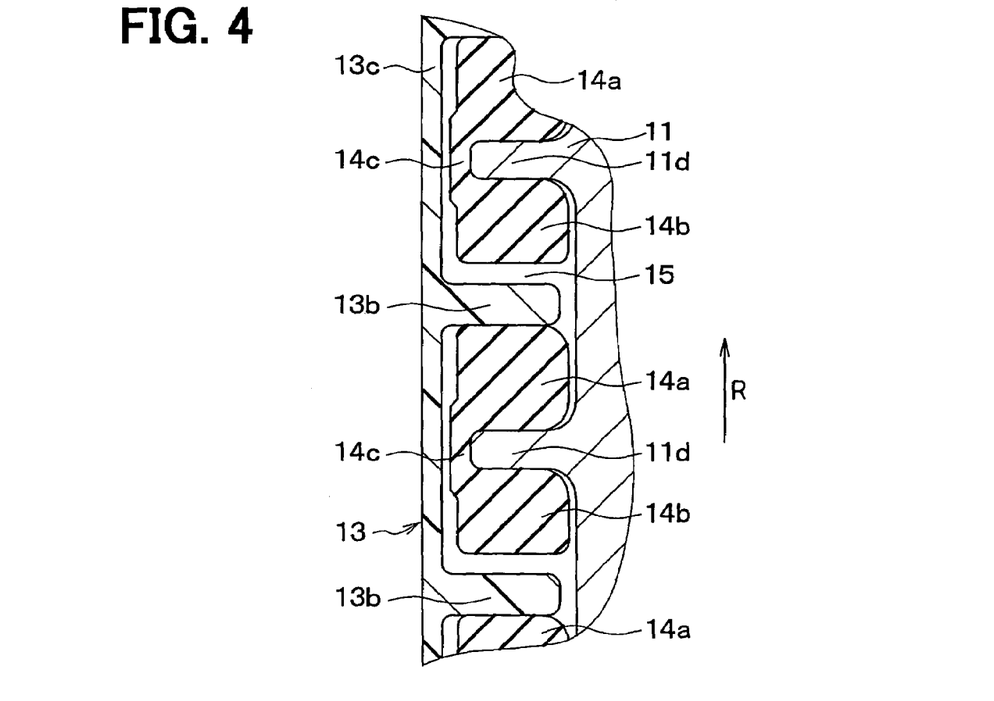
FIG. 4 is a sectional view taken along IV-IV in FIG. 3.

As shown in FIG. 4, a plurality of protruding portions 11d is integrally formed in a portion of the pulley body 11 that faces the plate portion 13c. Namely, the protruding portions 11d protrude towards the center hub 13. When the pulley body 11 and the center hub 13 are loaded into the compressor 1, each protruding portions 13b of the center hub 13 and each protruding portions 11d of the pulley body 11 are alternately located along the shaft 1b with being biased in the rotation direction of the shaft 1b.

Between each protruding portions 13b and each protruding portions 11d, a first damper 14a or a second damper 14b is disposed as a torque transmitting member. The first and second dampers 14a, 14b are made of elastically transformable material such as EPDM (ethylene-propylene-diene ternary polymerization rubber).

Here, the first damper 14a transmits from the protruding portion 11d of the pulley body 11 to the protruding portion 13b of the center hub 13 by being transformed due to compressing force when the pulley body 11 is rotated relatively to the center hub 13 (hereinafter, called as "in a normal rotation direction" shown in Arrow R in the figures).

By contrast, the second damper 14b is transformed when the pulley body 11 is rotated reversely to the normal rotation direction (hereinafter, called as a reverse rotation direction). The dampers 14a, 14b are connected through a connecting member 14c to form a damper pair of two dampers 14a, 14b. A plurality of the damper pairs are circumferentially disposed.

Dimensions of both the dampers 14a, 14b and both the protruding portions 11d, 13b in a direction of a compressing force are designed as having a gap 15 between the second damper 14b and at least one of the protruding portion 11d and the protruding portion 13b when the damper 14a connects both the protruding portions 11d, 13b.

In detail, when the pulley body 11 is rotated in the normal rotation direction, the first damper 14a contacts both the protruding portions 11d, 13b with being transformed due to the compression force while the second damper 14b is located with having a gap 15 with the protruding portion 13b of the center hub 13.

In the next place, the pulley 10, i.e., the torque transmission system will be explained regarding its operation.

As the engine 6 starts, the pulley body 11 is rotated in the normal rotation direction relative to the center hub 13. The first damper 14a is thereby compressed and transformed, so that reactive force to the compression is transmitted as a torque to the center hub 13.

Here, a rotation angle difference between the pulley body 11 and the center hub 13 is generated due to load fluctuation generated in the compressor 1 and torque fluctuation generated in the engine 6. This rotation angle difference is absorbed by elastic transformation of the first and second dampers 14a, 14b. When a torque transmitted between the pulley body 11 and the center hub 13 exceeds a given value, the bridge portion 13d is broken. The transmission of the torque is thereby interrupted between the pulley body 11 and the center hub 13. Namely, in this embodiment, the bridge portion 13d acts as a torque limiter that interrupts when the transmitted torque exceeds the given value.

In the next place, an effect of the embodiment will be explained below. When a rotation speed of the engine 6 or pulley body 11 is remarkably fluctuated according to torque fluctuation of the engine 6, a rotation angle difference is generated so that the pulley body 11 is biased to the center hub 13 in the reverse rotation direction. In the embodiment, when the first damper 14a contacts both the protruding portions 11d, 13b, the second damper 14b is located with having a gap 15 with at least one of the protruding portion 11d and protruding portion 13b. Even when the pulley body 11 is rotated in the reverse rotation direction relative to the center hub 13, no reverse torque is thereby transmitted to the center hub 13 as long as the gap exists, namely before the second dumper 14b contacts the protruding portion 13b of the center hub 13.

Thus the torque fluctuation of the engine 6 is absorbed. This thereby prevents transmission of a reverse torque to the center hub 3, loosening of fastening part between the center hub 13 and the shaft 1b, or abnormal noise or aversive vibration.

Furthermore, sufficient absorbing the torque fluctuation of the engine 6 leads to enabling the dampers 14a, 14b to have relatively small elastic coefficients to thereby sufficiently absorb the torque fluctuation in the normal or reverse rotation direction. Furthermore, this can prevent torque limiter's mis-operation where the bridge portion 13d is broken at a torque value being remarkably different from the given value.

Figure 5:
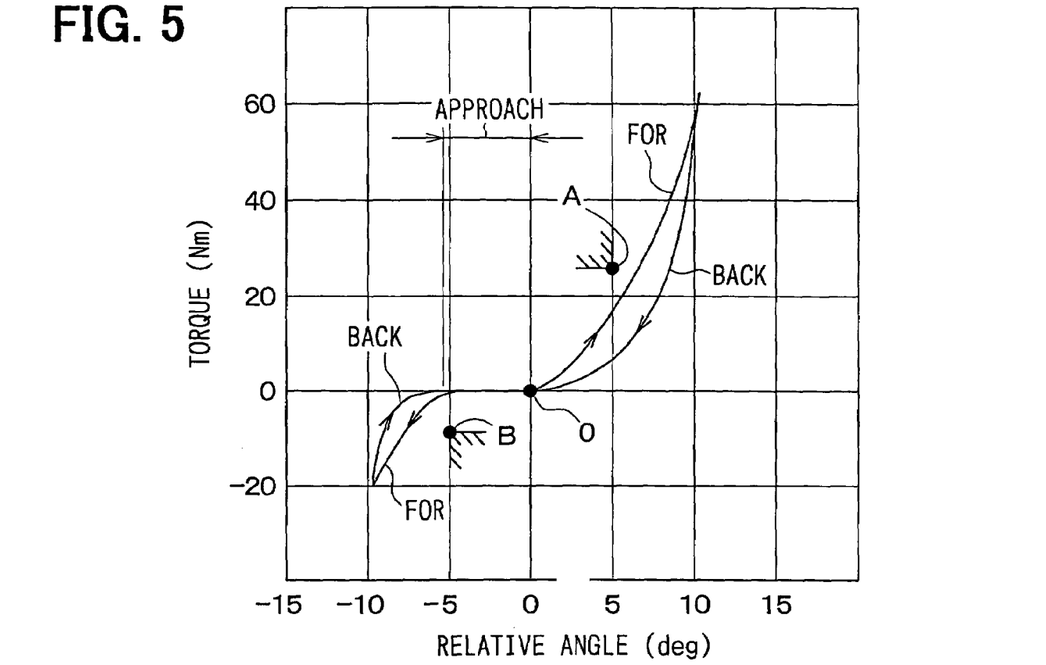
FIG. 5 is a graph showing relationship between a torque and a relative angle of a center hub relative to a pulley body according to the first embodiment.
Figure 6:
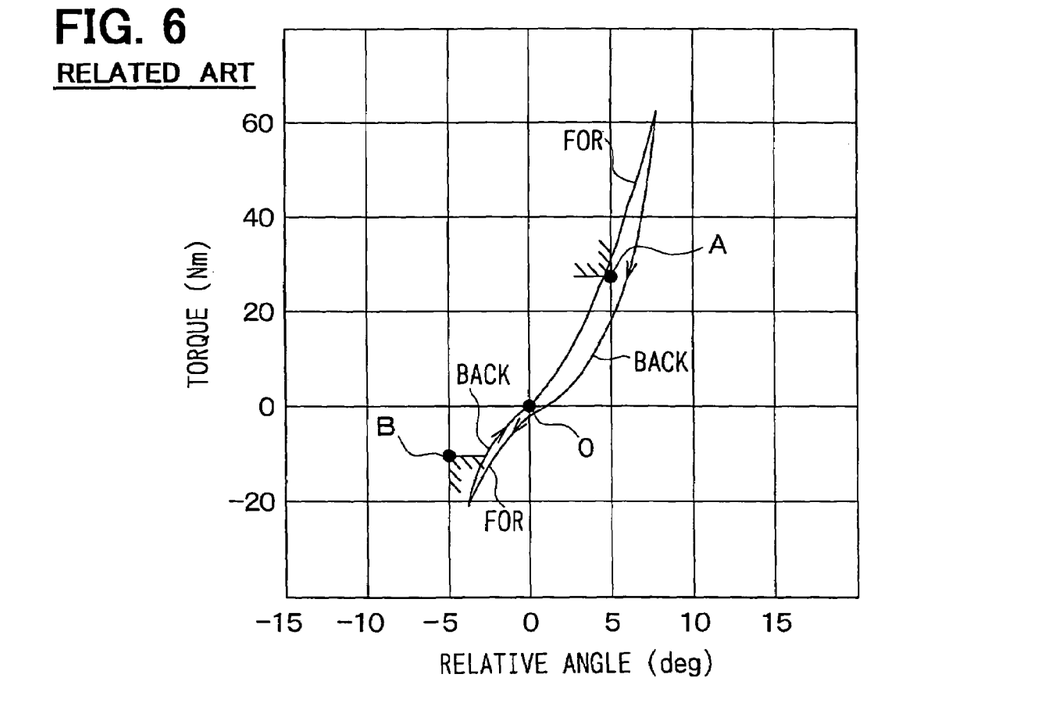
FIG. 6 is a graph showing relationship between a torque and a relative angle of a center hub relative to a pulley body according to a related art.

FIG. 5 is a graph showing relationship between a transmission torque and a relative angle in the embodiment, while FIG. 6 is a corresponding graph based on a product according to JP-A-2002-147485 as the related art. Here, the transmission torque is formed between the pulley body 11 and the center hub 13, while the relative angle is formed between the pulley body 11 and the center hub 13.

It is clear from FIG. 5 that a transmission torque is designed as being equal to 26 Nm designated by character A or less when the pulley body 11 is rotated by five degrees from a base designated by character O in the normal rotation direction under room temperature (25° C.) in the embodiment. It is also clear that the transmission torque is designed as being equal to 10 Nm designated by character B or less when the pulley body 11 is rotated by five degrees from the base O in the reverse rotation direction under room temperature (25° C.).

Namely, in the embodiment, the elastic coefficients in the normal and reverse rotation directions are sufficiently small, so that the torque fluctuation in the normal and reverse rotation directions can be sufficiently absorbed, respectively.

Here, the base having a relative rotation angle of zero corresponds to a state where compressed transformation of the first damper 14a is approximately zero when the first damper 14a contacts both the protruding portions 11d, 13b. The elastic coefficient is defined as a changing rate of the transmission torque between the pulley body 11 and the center hub 13, to the relative rotation angle of the pulley body 11 relative to the center hub 13.

According to investigation by the inventor, a range of the torque fluctuation can be reduced to half of that of the related art (74 Nm→36 Nm), while a range of the torque fluctuation in the reverse rotation direction can be reduced to approximately zero.

(Second Embodiment)

Figure 7:
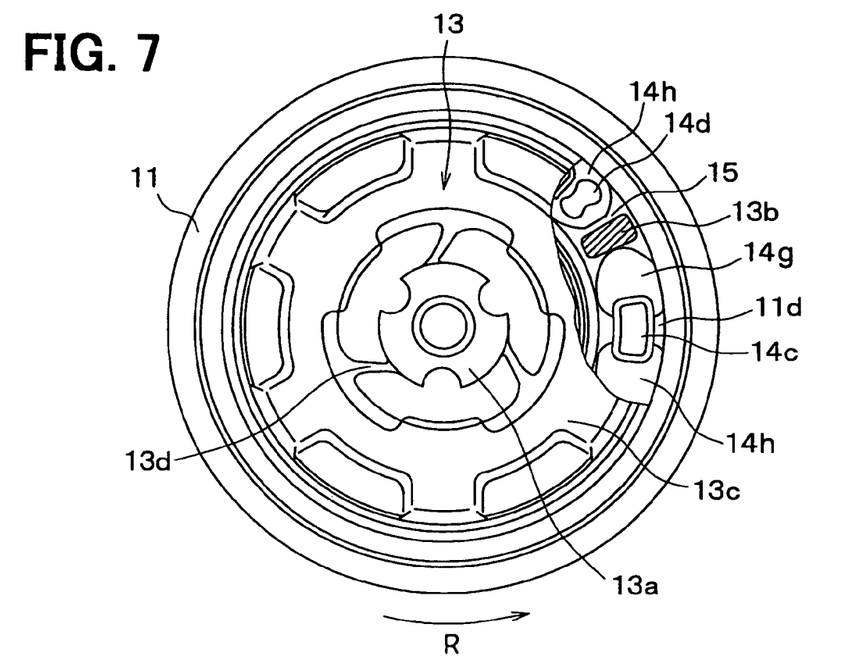
FIG. 7 is a left-side view, partially including a sectional view, of a pulley according to a second embodiment.

In a second embodiment, as shown in FIG. 7, a second damper 14h is provided with a hole portion 14 whose inside distance between facing walls in the rotation direction, i.e., compression direction, can be reduced. The second damper 14h thereby has a non-liner characteristic so that the elastic coefficient of the second damper 14h can be increased with increasing compression transformation. In contrast, a first damper 14g is the same as the first damper 14a in the first embodiment.

(Third Embodiment)

Figure 8:
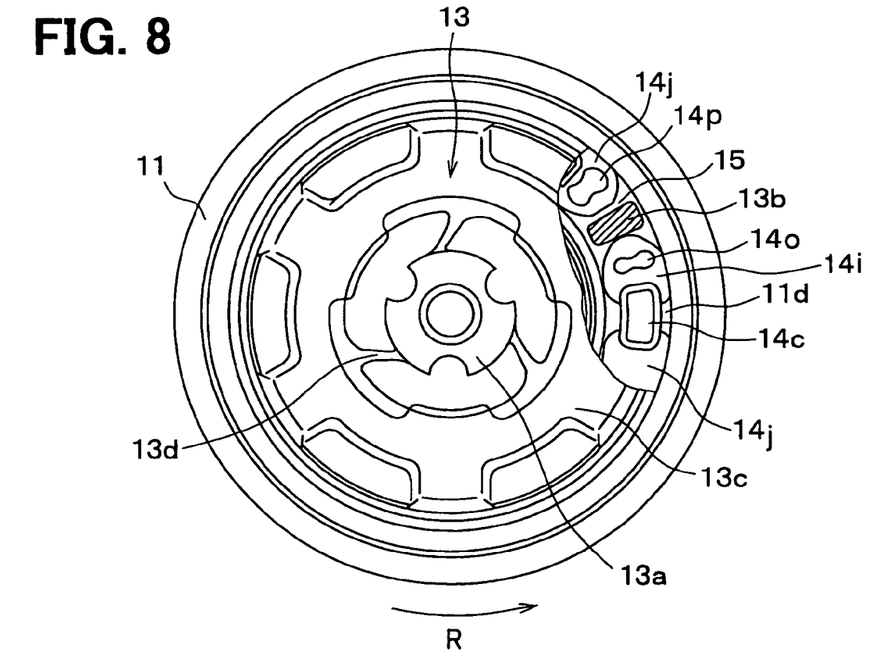
FIG. 8 is a left-side view, partially including a sectional view, of a pulley according to a third embodiment.

In a third embodiment, as shown in FIG. 8, both first and second dampers 14i, 14j are provided with hole portions 14o, 14p whose inside distances between facing walls in the rotation direction, i.e., compression direction, can be reduced. The dampers 14i, 14j thereby have non-liner characteristics so that the elastic coefficients of the dampers 14i, 14j can be increased with increasing compression transformation.

Here, the hole portions 14o, 14p are favorably designed so that the first damper 14i has a greater elastic coefficient than the second damper 14j.

(Fourth Embodiment)

Figure 9:
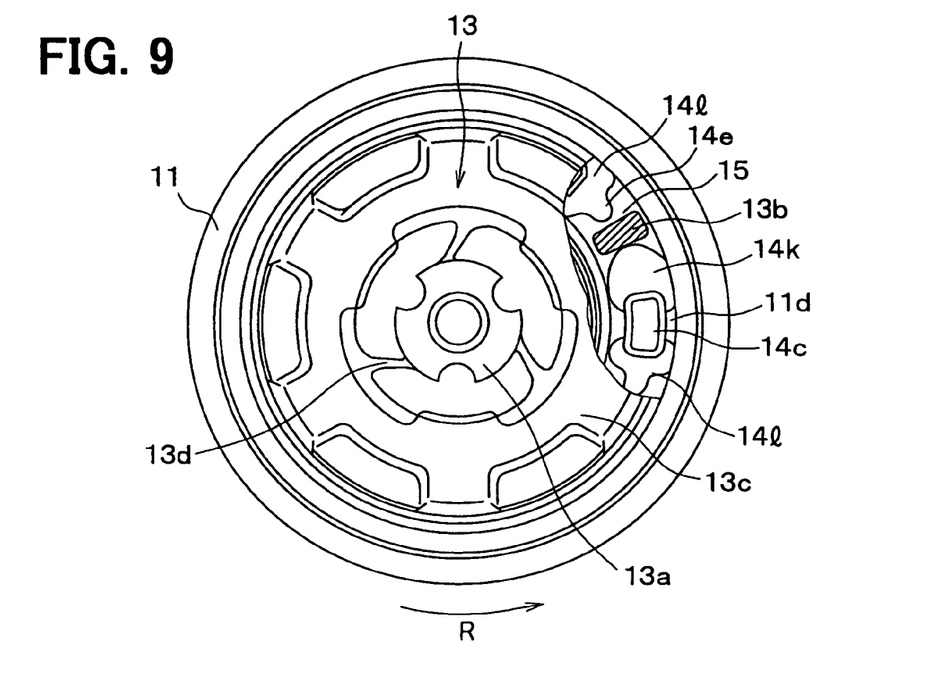
FIG. 9 is a left-side view, partially including a sectional view, of a pulley according to a fourth embodiment.

In a fourth embodiment, as shown in FIG. 9, a second damper 14l is provided with a protruding portion 14e so that cross-sectional dimensions of the damper 14l decreases in the rotation direction towards a protruding portion 13b of a center hub 13. The damper 14l thereby has a non-liner characteristic so that the elastic coefficient of the damper 14l can be increased with increasing compression transformation. In contrast, a first damper 14k is the same as the first damper 14a in the first embodiment.

(Fifth Embodiment)

Figure 10:
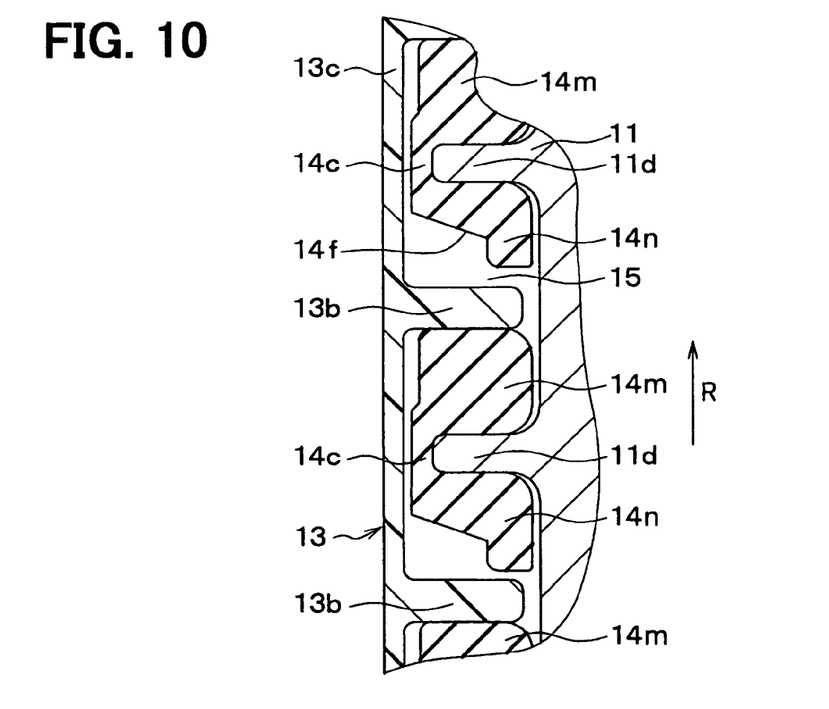
FIG. 10 is a view showing features of a pulley according to a fifth embodiment.

In a fifth embodiment, as shown in FIG. 10, a second damper 14n is provided with an inclined portion 14f so that the elastic coefficient of the damper 14n is thereby reduced. In contrast, a first damper 14m is the same as the first damper 14a in the first embodiment.

(Modification)

In the above embodiments, the dampers 14a, 14b, 14g, 14h, 14i, 14j, 14k, 14l, 14m, and 14n are made of rubber (EPDM), but they can be also made of other materials such as an elastomer, resin, metal, and the like.

In the above second and third embodiments, the hole portion 14d, 14o, or 14p is a through-hole, but it can be a concave instead of the through-hole.

In the above embodiments, the present invention is directed to a pulley 10 that transmits a torque to a compressor 1, but the present invention can be also directed to other transmission systems.

It will be obvious to those skilled in the art that various changes may be made in the above-described embodiments of the present invention. However, the scope of the present invention should be determined by the following claims.

What is claimed is:

1. A torque transmission system for transmitting a torque from a driving unit to a rotation unit, the system comprising:
  a first rotating member rotated by receiving the torque by the driving unit;
  second rotating member that is connected to a rotating portion of the rotation unit, rotated along with the rotation portion, and disposed coaxially with the first rotating member; and
  a first protruding portion protruding from the first rotating member to towards the second rotating member;
  a second protruding portion protruding from the second rotating member towards the first rotating member, wherein the first protruding portion and second protruding portion are meshed with each other;
  a first elastic member that is elastically transformable; and
  a second elastic member that is elastically transformable,
  wherein the first protruding portion and the second protruding portion provide (i) a pair of first faces, which sandwich the first elastic member and transmit only a normal rotational torque from the first rotating member to the second rotating member, and (ii) a pair of second faces, which sandwich the second elastic member and transmit only a reverse rotational torque from the first rotating member to the second rotating member, wherein the second elastic member is disposed to be apart with a gap from at least one face of the second faces when the first elastic member contacts both the first faces in a state where a compressed transformation is zero, and wherein even when the first rotating member is rotated in a reverse rotation direction, no reverse rotational torque is transmitted to the second rotating member as long as the gap exists.

2. The torque transmission system according to claim 1, wherein, when the first rotating member is rotated in a normal rotation direction relative to the second rotating member, the first elastic member contacts both the first and second protruding portions.

3. The torque transmission system according to claim 1, wherein it is designed that, when the first rotating member is rotated by a given rotation angle in a reverse rotation direction relative to the second rotating member, the second elastic member contacts both the first and second protruding portions.

4. The torque transmission system according to claim 1, wherein a transmission torque is designed as, being not more than 26 Nm when the first rotating member is rotated by a rotation angle of five degrees in a normal rotation direction relative to the second rotating member at room temperature.

5. The torque transmission system according to claim 1, wherein a transmission torque is designed as being not more than 10 Nm when the first rotating member is rotated by a rotation angle of five degrees in a reverse rotation direction relative to the second rotating member at room temperature.

6. The torque transmission system according to claim 1, further comprising: a torque limiter that interrupts a torque transmitted from the first rotating member to the second rotating member when the transmitted torque exceeds a given value.

* * * * *